United States Patent Office 2,783,160
Patented Feb. 26, 1957

2,783,160
FILM FORMING OIL STABILIZED WITH DIBASIC LEAD PHOSPHITE

Jolly J. Taylor, Los Angeles, Calif.

No Drawing. Application March 30, 1953,
Serial No. 345,737

8 Claims. (Cl. 106—256)

This invention relates to the use of dibasic lead phosphite as an additive to drying and semi-drying oils, and drying and semi-drying alkyds.

This application is a continuation-in-part of my application Serial 314,560, filed October 13, 1952.

I have found that dibasic lead phosphite has a strong inhibiting effect to stabilize oil. In application Serial 314,560, I have described the use of this compound as a stabilizer for oil base paint formulated with drying or semi-drying oils, which paint may contain oil or fatty acid modified alkyd resins, particularly the drying and semi-drying alkyd resins, or both oil and alkyd. The alkyds may be formulated by reacting drying oils or semi-drying oils or the equivalent fatty acid with glyceryl phthalate, maleate or sebacate in a manner well known for formulating these alkyds. Thus paints formulated with drying oils such as linseed oil, both virgin and treated, dehydrated castor oil, soya, sesame, hempseed, sunflower, China wood, and tung oil, or with alkyds formed therefrom or from their equivalent acids or both, may be stabilized by the dibasic lead phosphite.

Pigments such as zinc oxide and zinc carbonate or lead carbonate or mixed lead and zinc base paints composed of a mixture of zinc oxide and lead carbonate are termed "reactive pigments," since paints which contain them in quantities sufficient to act as pigments will chalk when exposed to light.

I have found that I may produce superior paints and film formers in my invention by employing, in contradistinction to the above reactive pigments, the inert or non-reactive pigments which will not react with the oil or reaction products of the oil when exposed to sunlight and air. Such non-reactive pigments includes titanium oxide and talc. Other siliceous pigments, such as aluminum silicate and mica, may be used. I may use antimony oxide, calcium carbonate, barium sulfate, zinc sulfate or lithopone. All of these pigments are classed as non-reactive pigments and are so classed by the oil trade.

I have observed that when paints formulated with these non-reactive pigments are exposed to sunlight and air in areas of intense sunlight, they, as well as the paints formulated with the reactive pigments, soon crack, chalk, and scale and the paint film breaks down.

I have found that small amounts of dibasic lead phosphite, when added to a paint formulated with non-reactive pigments, will stabilize the paint against scaling. The film produced from such stabilized paint will last much longer and scale less than a paint formulated with an inert filler from which the stabilizer is omitted. Comparing lead carbonate paints, in which the filler is entirely lead carbonate and carried in a linseed oil base containing a drying accelerator and mineral spirits in a conventional formulation, exemplified in Patent No. 2,483,469, with paint carrying the non-reactive filler and the stabilizer dibasic lead phosphite formulated according to the invention described herein, the lead carbonate paint will scale much more under exposure to sunlight and air for like periods than the stabilized paint referred to above.

The amount of dibasic lead phosphite required to give this stabilization is but a small percentage of paint pigment or filler, for example, below about .5 to 7.5% of the paint formulated with lead carbonate. The gloss retention of such paints is unsatisfactory in climates of intense sunlight and high summer temperature.

While I do not wish to be bound by any theory of the action of the dibasic lead phosphite, I believe that the dibasic lead phosphite inhibits the oxidative decomposition of the oil or of the oil or fatty acid modified alkyd.

I have found that the stabilization properties of the dibasic lead phosphite are applicable to the hydrocarbon oils such as petroleum oils and capable of stabilizing such oils. I am of the opinion that in the stabilization of these petroleum oils the dibasic lead phosphite acts as an inhibitor of the attack of oxygen on these hydrocarbons or hydrocarbon chains.

It is significant that the hydrocarbon oils contain saturated and unsaturated radicals, just as the drying and semi-drying oils and the semi-drying and drying alkyds all contain saturated and unsaturated alkyl radicals. Thus the saturated and unsaturated fatty acids, to wit, palmitic, stearic, resinolic, oleic, linoleic, linolenic, oleostearic, all contain long alkyl or alkene radicals and are carboxylic acid derivatives of the corresponding hydrocarbons. The glyceryl esters of these acids are constituents of the drying and semi-drying oils referred to above. The above mentioned alkyds are also derivatives containing these alkyl and alkene radicals. These hydrocarbon oils, esters, and alkyds are all included in the term "oleaginous" vehicles as hereafter employed.

These oleaginous vehicles of petroleum origin or glyceryl esters of the saturated or unsaturated fatty acid containing compounds which have alkyl, alkene or naphthenic groups or comprising the saturated or unsaturated alkyl radicals may be stabilized against oxidative attack by the addition of about 0.2 to 25% by weight or less of dibasic lead phosphite dispersed in the oil, based on the oil. The dibasic lead phosphite is sold by the National Lead Company as "Dyphos" and has the asserted formula $2PbO \cdot PbHPO_3 \cdot \frac{1}{2}H_2O$.

It is desirable, however, when using the said stabilizer in paints or other coatings to limit the percentage of the stabilizer so that it forms a minor constituent of the paint or coating and is not depended upon to be the main pigment constituent. Excessive concentration of the Dyphos materials will cause poor gloss retention and high degree of cracking. By reducing the concentration of the dibasic lead phosphite and employing, preferably, non-reactive pigment to supply the major portion of the pigment and filler required for the paint, a stabilized paint with improved resistance to cracking and gloss retention is obtained over that which may be obtained without the use of the dibasic lead phosphite or where excessive amounts thereof are employed, as where it is relied upon as the major or total constituent of the pigment. It is thus desirable to limit the concentration of the dibasic lead phosphite to less than about 7.5% of the paint foundation. Since the optimum concentration will depend upon the nature of the oleaginous vehicle, it will be necessary to adjust the concentration to give the most desirable result. Those skilled in this art will be readily able to ascertain this value from the description herein given.

The following examples are given, not as limitations, but as illustrations, of my invention:

*Example 1*

This example illustrates the application of my stabilizer to paints.

I may use the pigment formulated with oils, mineral spirits, with or without the alkyds, or with the alkyds and solvent, omitting the oil, in a manner conventional for making up paints with these conventional and well known pigments, oils or alkyds. To the paint I add dibasic lead phosphite in amount of from .5 to 7.5% by weight of the paint (pigment plus film former, i. e., oil or alkyd or oil and alkyd) and lead salicylate in amount from 100% to 300% by weight of the dibasic lead phosphite.

An example of a successful paint is given by the following formation:

|  | Pounds |
|---|---|
| TiO$_2$ pigment | 43 |
| Talc | 60 |
| Raw linseed oil | 24 |
| Pine oil | 1.4 |
| Mineral spirits | 4.0 |

The above are ground together with

|  | Pounds |
|---|---|
| Drying alkyd resin | 20 |
| Mineral spirits | 6 |
| 24% lead naphthanate | .35 |
| 6% cobalt naphthanate | 15 |

The following were separately milled and added to the above mixture:

|  | Pounds |
|---|---|
| Dyphos | 1.5 |
| Raw linseed oil | 3.6 |

Dyphos is sold by the National Lead Company and has the formulation: 2PbO.PbHPO$_3$½H$_2$O, and is described in Patent No. 2,483,469. Wherever Dyphos or dibasic lead phosphite is employed in this application, it means this above procedure.

It will be observed that the drying oils, the drying alkyds and the pigment and drying accelerators are used in the proportions conventional for paint formulations, and further discussions of the proportions and ranges and proportions of oil and/or alkyd and of the pigment and drying accelerators are unnecessary, as will be understood by those skilled in the art.

I may, also, desirably, but need not, add lead salicylate Pb(C$_6$H$_4$OHCO)$_2$ obtained, as, for example, in Patent No. 2,483,469.

I may use the lead salicylate in an amount ranging from 100% to 300% of the dibasic lead phosphite. I have found that the addition of the lead salicylate reduces the chalking rate of white pigmented paints, as is more fully disclosed in application Serial No. 314,560.

The paint containing the dibasic lead phosphite and normal lead salicylate was painted on one side of a Douglas fir wood, one inch thick panel, and adjacent it was applied the same paint from which, however, dibasic lead phosphite and the lead salicylate were omitted. The paint containing the dibasic lead phosphite and the lead salicylate, after two years' exposure to atmospheric condition in the open, showed substantially no cracking or scaling or chalking and had the same high gloss that it had originally, while the surface right next to it painted with the paint in which the lead salts were not added cracked, chalked, scaled, and developed a dull surface after fourteen months' exposure to such a degree as to constitute a destruction of the paint film. It was observed that the wood beneath the paint film containing the dibasic lead phosphite and lead salicylate showed no sign of checking, splitting, cracking, that is, no grain splitting, while the wood adjacent thereto under the paint not containing the dibasic lead phosphite and lead salicylate showed evidence of a large amount of grain splitting after three years' exposure. The portion of the wood underlying the paint which did not contain the dibasic lead phosphite showed deep cracks which extended along the length of the board to both of the edges, while the panel portion underlying the paint containing the dibasic lead phosphite showed no evidence of cracking and appeared to be fully sound. It appears, therefore, that such paints containing the stabilizer of this invention are highly useful as wood preservatives and that wood may be preserved against checking or cracking caused by atmospheric exposure by painting the surface thereof with a paint or other surface coating material containing the stabilizer of my invention.

It is significant to note that the surface coated with the paint formulated according to my invention becomes soft and plastic if heated to 140–150° F., thus indicating the high effectiveness of the stabilizer composition of my invention. The films produced from paints to which the stabilizer composition of my invention are not added are hard and brittle and will not soften under like heating.

Thus, I may add to such paint about three pounds of the above normal lead salicylate by milling it together with the dibasic lead phosphite.

While I have disclosed the application of my stabilizer to pigmented paints carrying non-reactive pigments, the stabilization of the film to prevent cracking, excessive drying and loss of gloss are also obtained in clear non-pigmented varnishes and other clear coatings employing as film formers the drying and semi-drying oils and/or drying or semi-drying alkyds, omitting any solid particles except the stabilizers referred to above. In such case, I restrict the amount of the dibasic lead phosphite and therefore the lead salicylate, if this is used, which, as before, is used in amounts varying from 100% to 300%, of the dibasic lead phosphite. I so restrict the amount of the dibasic lead phosphite and the lead salicylate, if this is used, in order that the film be clear, since the above materials impart opacity to the film if used in too large amounts. The amount should, therefore, for this purpose, be made as high as possible within the ranges given above for the pigmented paints, but not so large as to give the undesired opacity.

The following example illustrates the action of dibasic lead phosphite as anti-oxidant in petroleum oil and as a stabilizer for greases formulated from such oil. These oils may be either acid refined or solvent refined oils of naphthenic or paraffinic crude oils. The solvent refined oils are made by extracting lubricating oil fractions with solvents such as phenol or furfural. In so doing the solvent removes the highly unsaturated and aromatic fractions as an extract, leaving a raffinate, which is composed mainly of the naphthenic, aliphatic, and perhaps those fractions containing aromatic rings which contain so many naphthenic and alkyl or alkene radicals as to make them partake non-aromatic character, as characterized by their relative insolubility in these solvents.

As is well known to those skilled in this art, such oils are now generally used as lubricating oils and for incorporation into lubricating greases. Greases, as is well known to those skilled in this art, are composed of an oil, usually petroleum oil, in which is dissolved or colloidally dispersed a soap or mixture of soap or other gel-forming additives which impart gel-like characteristics. To such greases may be added additives such as higher alcohols, esters, organic amines, polybutenes, sulfurized fatty materials, sulfur-chlorine compounds, fillers, such as graphate, talc, asbestos, mica, alumina, powdered zinc, zinc oxide, red lead, carbon black, and magnesium oxide. Such soaps may be alkaline soaps, for example, sodium potassium or lithium soaps, or alkaline earth soaps, for example, magnesium, calcium, barium or barium soap complex with barium acetate, or strontium soaps, lead soaps, zinc soaps, aluminum soaps, all being soaps or salts of organic acids usually saturated or unsaturated soap-forming fatty acids, such as stearic, palmitic, lauric, myristic, or of the unsaturated acids referred to above in connection with the alkyds. Other gelling agents may be used, as for example, the organophilic clays produced by exchanging clays having a suitable base exchange capacity with an onium compound; for example, greases formed according to U. S. Patent No. 2,531,440, employing the organophilic clay referred to in said patent or in U. S. Patent No. 2,531,427.

I have found that greases on exposure to light, and particularly if also exposed to elevated temperatures and high humidity, have their gel-like grease structures impaired and their utility as greases seriously impaired. While I do not wish to be bound by any theory of this action, I believe that the action is the result of the oxidative attack on the oil constituent of the grease. I have found that if I add from about .2 to about 25% by weight of dibasic lead phosphite based on the oleaginous vehicle in the grease, the grease is stabilized and will not break down as will like greases which do not contain this material.

Excessive quantities of the solid dibasic lead phosphite may give excessive quantities of solid matter in the grease. It is preferable to use the dibasic lead phosphite in fine particle size for incorporation into the grease, for example, particles of an average size of less than about five micron are useful for this purpose. The amount of stabilizer desirable will depend upon the nature of the oleaginous vehicle, i. e., its inherent oxidative resistance. As is well known, petroleum oils vary in their resistance to oxidation. It will be desirable to employ as little of the stabilizer as is required for the desired stabilization in order to reduce the solid content of the grease to as small proportion as is consistent with attaining the desired degree of stabilization. Those skilled in the art will be able to properly proportion my stabilizer from the description given herein. The following examples illustrate this phenomenon:

Example 2

A standard commercial sodium base grease, i. e, a grease made with a sodium salt of a soap-forming acid by saponification of tallow, was spread on part of a 10 x 4½" black iron panel. On the adjoining part of the panel was spread grease formed by mixing S. A. E. #30 with Bentone 34 in amount equal to 9% of the oil and Dyphos in amount equal to 10% of the oil. Bentone 34, referred to in this example and in Example 4, is understood to be dimethyl octadecyl cetyl ammonia bentonite. Such a clay corresponds to the organophilic clays referred to in Patents 2,531,440 and 2,531,427. Such a material is sold under the trade name "Bentone 34" by National Lead Company. A strip of metal was left uncovered on the panel to separate the two greases. The panel was left in a high humidity cabinet for a month at a room temperature of 50–85° F. On inspection it was observed that the sodium base grease without the dibasic lead phosphite has been almost completely removed from the panel as if it were washed off, while the grease containing the dibasic lead phosphite was unaffected. The panel was replaced in the cabinet and the exposure continued under the same conditions. The small remaining part of the sodium base grease film was oxidized to almost non-tacky form within three to four months; however, the grease containing the dibasic lead phosphite, after ten months' exposure, showed no apparent change in properties on visual inspection. The grease had its original consistency and appeared unoxidized. No grease was lost from the panel in contradistinction to the adjacent grease which did not contain the dibasic lead phosphite.

Example 3

The test described in Example 2 was also performed using in place of the sodium base grease, a calcium base grease. The metal under calcium base grease without the dibasic lead phosphite was badly blistered and rusted and mildewed, while the metal under the calcium base grease to which 10% dibasic lead phosphite was added was untouched and the grease stabilized by the dibasic lead phosphite was unaffected.

Example 4

A grease was made by intimately mixing in a mill the following:

| | Pounds |
|---|---|
| S. A. E. #30 of oil | 15 |
| Bentone, identified above | .9 |
| Dibasic lead phosphite | 1.5 |

Another grease was made up in the same manner using 7½ pounds S. A. E. #30 oil, 1 pound of the dibasic lead phosphite and 0.45 pound of the Bentone.

Both greases when tested on a "Weeks" machine, a machine generally accepted in the oil industry as a measure of the extreme pressure lubricating value of oils and greases, were good up to 3400 p. s. i. according to this test.

The grease formed with 5 pounds of the above S. A. E. #30 lubricating oil, 0.4 pound of Bentone and 0.5 pound of dibasic lead phosphite was heated to about 160° F. and intimately mixed and homogenized. Test panels were covered in part by this grease and adjacent thereto the panel was covered with a commercial calcium soap cup grease. The panels were exposed to a high humidity, high temperature test chamber. After 4 months' exposure, the cup grease was oxidized to a dry film while the grease formulated with the dibasic lead phosphite remained soft and with the original consistency by visual inspection.

While I have described a particular embodiment of my invention for the purpose of illustration, it should be understood that various modifications and adaptations thereof may be made within the spirit of the invention as set forth in the appended claims.

I claim:

1. In a composition of matter, the combination with a film former taken from the group consisting of the drying oils, semi-drying oils, drying alkyds, and semi-drying alkyds, of a minor effective amount of dibasic lead phosphite as a stabilizer therefor.

2. In a composition of matter as defined in claim 1, the amount of said phosphite being from about 0.2% to about 25% by weight based on the film former.

3. In a composition of matter, the combination with a drying alkyd film former of from about 0.2% to about 25% by weight of dibasic lead phosphite based on the film former, as a stabilizer therefor.

4. In a composition of matter as defined in claim 1, the amount of said phosphite being from about 0.5% to about 7.5% by weight based on the composition.

5. In a composition of matter, the combination with a drying alkyd film former of from about 0.5% to about 7.5% by weight of dibasic lead phosphite based on the composition, as a stabilizer therefor.

6. In a coating composition, the combination with a film former taken from the group consisting of the drying oils, the semi-drying oils, drying alkyds, and semi-drying alkyds, of a non-reactive pigment, and from about 0.2% to about 25% by weight of dibasic lead phosphite based on the film former, as a stabilizer therefor.

7. In a coating composition, the combination with a film former taken from the group consisting of the drying oils, semi-drying oils, drying alkyds, and semi-drying alkyds, of a non-reactive pigment, and from about 0.5% to about 7.5% by weight of dibasic lead phosphite based on the film former plus pigment, as a stabilizer therefor.

8. In a coating composition, the combination with a drying alkyd film former, of a non-reactive pigment, and from about 0.5% to about 7.5% by weight of dibasic lead phosphite based on the film former plus pigment, as a stabilizer therefor.

References Cited in the file of this patent

UNITED STATES PATENTS

| | | |
|---|---|---|
| 2,108,616 | Schaefer | Feb. 15, 1938 |
| 2,406,609 | Kebrich et al. | Aug. 27, 1946 |
| 2,483,469 | Kebrich | Oct. 4, 1949 |
| 2,552,570 | McNab et al. | May 15, 1951 |
| 2,652,362 | Wood et al. | Sept. 15, 1953 |

OTHER REFERENCES

"Rubber Age" of July 1949, page 451.